(12) United States Patent
Åström et al.

(10) Patent No.: US 12,389,484 B2
(45) Date of Patent: Aug. 12, 2025

(54) HANDLING OF LINK FAILURE BETWEEN A REFLECTION NODE AND A NETWORK NODE

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 372 days.

(21) Appl. No.: 18/246,945

(22) PCT Filed: Oct. 9, 2020

(86) PCT No.: PCT/EP2020/078388
§ 371 (c)(1),
(2) Date: Mar. 28, 2023

(87) PCT Pub. No.: WO2022/073618
PCT Pub. Date: Apr. 14, 2022

(65) Prior Publication Data
US 2023/0371106 A1 Nov. 16, 2023

(51) Int. Cl.
*H04W 76/19* (2018.01)
(52) U.S. Cl.
CPC .................. *H04W 76/19* (2018.02)
(58) Field of Classification Search
CPC ...................................... H04W 76/19
See application file for complete search history.

(56) References Cited

U.S. PATENT DOCUMENTS 10,419,948 B1   9/2019  Labadie et al.
11,575,429 B1 * 2/2023  Lerosey ............... H01Q 15/002
(Continued)

FOREIGN PATENT DOCUMENTS

CN    111131096 A    5/2020
CN    111163515 A    5/2020
(Continued)

OTHER PUBLICATIONS

International Search Report and Written Opinion dated Jul. 1, 2021 for International Application No. PCT/EP2020/078388 filed on Oct. 9, 2020, consisting of 9 pages.
(Continued)

*Primary Examiner* — Harry H Kim
(74) *Attorney, Agent, or Firm* — Weisberg I.P. Law, P.A.

(57) ABSTRACT

There is provided a reflection node for handling link failure towards a network node. The reflection node includes a controller for controlling a passive meta-surface having a controllable reflection angle for reflecting radio waves over a communication channel between a network node and a wireless device. The reflection node includes a transceiver unit for receiving instructions from the network node over a control channel. The transceiver unit is configured to determine a link failure event on the control channel between the reflection node and the network node. The controller is configured to, during the link failure event, control the reflection angle of the passive meta-surface using reflection settings specified by configuration data for reflecting the radio waves over the communication channel.

20 Claims, 4 Drawing Sheets

(56) References Cited

U.S. PATENT DOCUMENTS

| | | | |
|---|---|---|---|
| 11,910,207 B2* | 2/2024 | Tadayon | H04W 16/24 |
| 2011/0244786 A1 | 10/2011 | Fujii et al. | |
| 2016/0233971 A1* | 8/2016 | Fink | H04W 4/80 |
| 2018/0249394 A1 | 8/2018 | Nilsson et al. | |
| 2019/0044246 A1 | 2/2019 | Pitsillides et al. | |
| 2019/0181920 A1 | 6/2019 | Rofougaran et al. | |

FOREIGN PATENT DOCUMENTS

| | | |
|---|---|---|
| EP | 3439107 A1 | 2/2019 |
| GB | 2489282 A | 9/2012 |
| KR | 20170025422 A | 3/2017 |
| WO | 2014104954 A1 | 7/2014 |

OTHER PUBLICATIONS

3GPP TS 36.331 V16.2.1; 3rd Generation Partnership Project; Technical Specification Group Radio Access Network; Evolved Universal Terrestrial Radio Access (E-UTRA); Radio Resource Control (RRC); Protocol spceification; (Release 16); Sep. 2020, consisting of 1081 pages.

Gopi, S. et al., Intelligent Reflecting Surface Assisted Beam Index-Modulation for Millimeter Wave Communication; IEEE Transactions of Wireless Communications, vol. 20 No. 2, Oct. 2020, consisting of 14 pages.

Yuan, X. et al., Reconfigurable-Intelligent-Surface Empowered Wireless Communications: Challenges and Opportunities; IEEE Wireless Communications, Aug. 17, 2020; consisting of 7 pages.

Di Renzo, M. et al., Smart Radio Environments Empowered by AI Reconfigurable Meta-Surfaces: An Idea Whose Time Has Come; EURASIP Journal on Wireless Communications and Networking; Mar. 21, 2019, consisting of 32 pages.

Wu, Q. et al., Intelligent Reflecting Surface Enhanced Wireless Network via Joint Active and Passive Beamforming; IEEE Transactions on Wireless Communications, vol. 18, No. 11, 2019, consisting of 16 pages.

Zhang, L. et al., Augmenting Transmission Environments for Better Communications: Tunable Reflector Assisted MmWave WLANs; IEEE Transactions on Vehicular Technology, vol. 69, No. 7, Apr. 30, 2020, consisting of 13 pages.

Nadeem, Q. et al., Intelligent Reflecting Surface Assisted Wireless Communication: Modeling and Channel Estimation; arXiv:1906.02360v2, Dec. 13, 2019, consisting of 7 pages.

Zhang, Q. et al., Millimeter Wave Communications with an Intelligent Reflector: Performance Optimization and Distributional Reinforcement Learning; arXiv: 2002.10572v1, Feb. 24, 2020, consisting of 30 pages.

Chinese Office Action and English Summary Translation dated Feb. 19, 2025 for Application No. 202080105980.5, consisting of 7 pages.

Ruya, Z., et al., A Brief Survey of Mobile Communications through Reconfigurable Intelligent Surfaces; Southeast University; Jun. 15, 2020; consisting of 7 pages.

Wang, Y.J., Intelligent reflecting surface : a promising technique for 6G; Telecommunications Information; Jul. 10, 2020, consisting of 6 pages.

International Search Report and Written Opinion dated Dec. 1, 2021 for International Application No. PCT/EP2021/055789 filed Mar. 8, 2021; consisting of 9 pages.

International Search Report and Written Opinion dated Feb. 2, 2021 for International Application No. PCT/EP2020/065081 filed May 29, 2020; consisting of 10 pages.

* cited by examiner

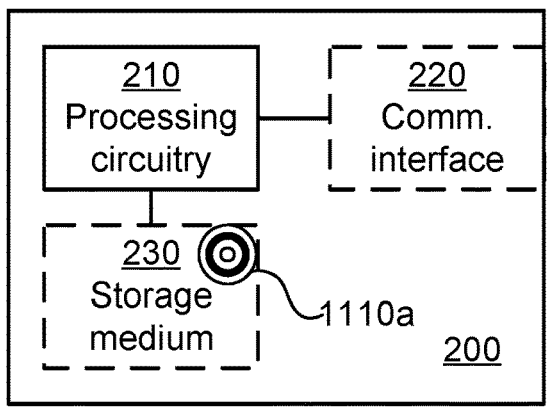
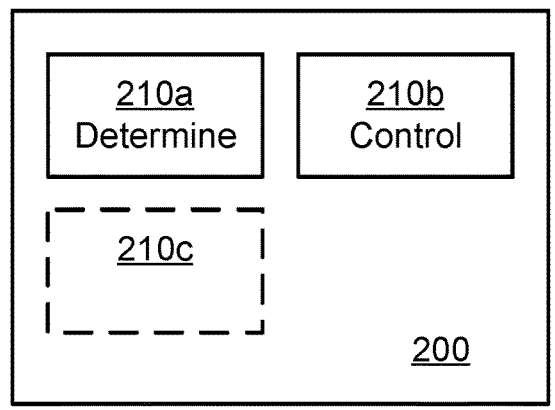
Fig. 7    Fig. 8
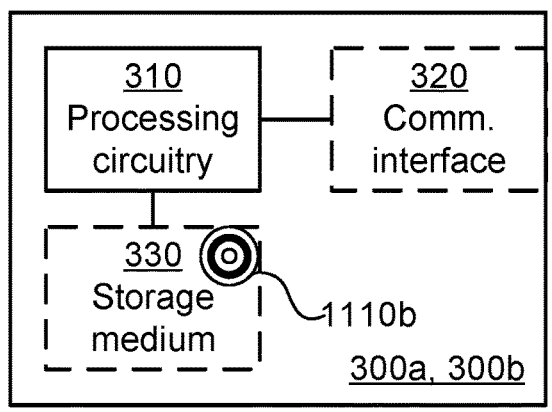
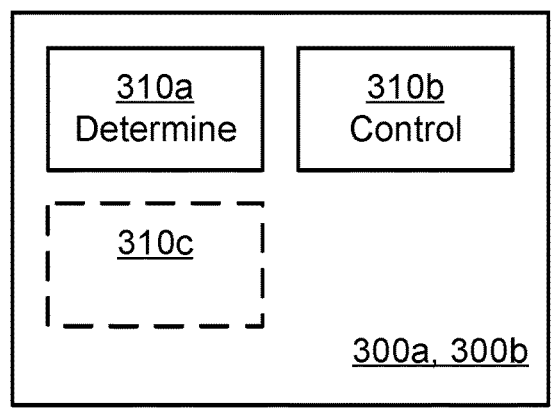
Fig. 9    Fig. 10
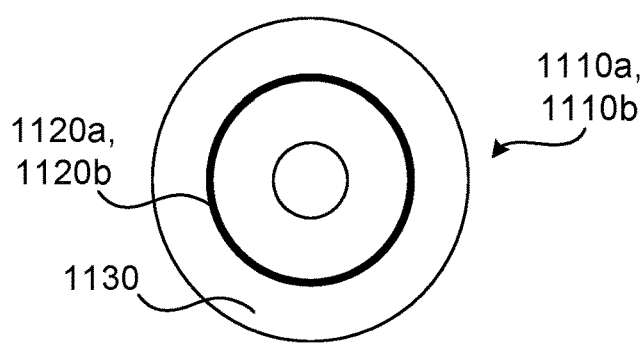
Fig. 11

HANDLING OF LINK FAILURE BETWEEN A REFLECTION NODE AND A NETWORK NODE

CROSS-REFERENCE TO RELATED APPLICATION

This application is a Submission Under 35 U.S.C. § 371 for U.S. National Stage Patent Application of International Application Number: PCT/EP2020/078388, filed Oct. 9, 2020 entitled "HANDLING OF LINK FAILURE BETWEEN A REFLECTION NODE AND A NETWORK NODE," the entirety of which is incorporated herein by reference.

TECHNICAL FIELD

Embodiments presented herein relate to a method, a reflection node, a computer program, and a computer program product for handling link failure towards a network node. Embodiments presented herein further relate to a method, a network node, a computer program, and a computer program product for handling link failure towards a reflection node.

BACKGROUND

Millimeter waves (mmWaves) corresponding to carrier frequencies above 10 GHz have been introduced for the new radio (NW) air interface as used in fifth generation (5G) telecommunication systems. However, communication over mmWaves are sensible to blocking, i.e. physical objects blocking the radio waves. A non-limiting example illustrating blocking and its effects will now be disclosed with reference to FIG. 1. FIG. 1 shows an example of a communications network 100a. The communication network 100a comprises two network nodes 300a, 300b (for example provided as (radio) access network nodes) that are configured to provide network access to wireless devices, one of which is shown at reference numeral 400a. The physically closest network node to wireless device 400a is network node 300a. However, the signal path, corresponding to communication channel 120a, between network node 300a and wireless device 400a is blocked by a first physical object 110a. Furthermore, possible non-line of sight signal paths, one of which is corresponding to communication channel 120b, from network node 300a do not reach wireless device 400a, since the reflection of the signal via physical object 110b does not reach wireless device 400a. This causes wireless device 400a to instead be operatively connected to network node 300b where a line of sight signal path exists, corresponding to communication channel 120c. Since network node 300b has a longer physical distance to wireless device 400a than network node 300a has, network node 300b hence has larger path loss.

One technique enabling the creation of smart radio environments involves the use of surfaces that can interact with the radio environment.

As disclosed in, for example, "Smart Radio Environments Empowered by AI Reconfigurable Meta-Surfaces: An Idea Whose Time Has Come" by Marco Di Renzo et al., as accessible on https://arxiv.org/abs/1903.08925 (latest accessed 20 Sep. 2020), "Reconfigurable-Intelligent-Surface Empowered Wireless Communications: Challenges and Opportunities" by Xiaojun Yuan et al., as accessible on https://arxiv.org/abs/2001.00364 (latest accessed 20 Sep. 2020), and "Intelligent Reflecting Surface Enhanced Wireless Network via Joint Active and Passive Beamforming" by Q. Wu and R. Zhang, in IEEE Transactions on Wireless Communications, vol. 18, no. 11, pp. 5394-5409, November 2019, doi: 10.1109/TWC.2019.2936025 such surfaces are commonly called meta-surfaces, reconfigurable intelligent surfaces, large intelligent surfaces, or intelligent reconfigurable surfaces. Without loss of generality or discrimination between these terms, the term meta-surface will be used throughout this disclosure.

A meta-surface is an electromagnetic surface made of electromagnetic material that is engineered in order to exhibit properties that are not found in naturally occurring materials. A meta-surface is, in practice, an electromagnetic discontinuity, which can be defined as a complex electromagnetic structure that is typically deeply sub-wavelength in thickness, is electrically large in transverse size, and is composed of sub-wavelength scattering particles with extremely small features. In simple terms, a meta-surface is made of a two-dimensional array of sub-wavelength metallic or dielectric scattering particles that transform incoming electromagnetic waves in different ways, thus causing the electromagnetic waves to be reflected in accordance with the structure of the meta-surface.

In further detail, a passive meta-surface is a meta-surface in which the scattering particles or the electromagnetic reflective properties are not fixed and engineered at the manufacturing phase but can be modified depending on external stimuli that is provided to the meta-surface. In this disclosure the external stimuli is defined by a control signal from the reflection node. In one example the passive meta-surface consists of arrays of passive patch antennas. That is, the antennas are not connected to active radio transceivers (i.e., devices capable to modulate data streams up to radio frequency and demodulate radio frequencies to data streams). Instead, the antennas in the array are connected to resistors, inductors, and/or capacitors of which the electrical impedance is controllable, and where the antennas are connected to the resistors, inductors, and/or capacitors towards a ground plane such that the reflection phase of respective antenna can be adapted based on electrical impedance setting. Thus, by controlling the electrical impedances of the respective patch antennas, the reflection angle of an incoming electromagnetic wave can be adapted according to the generalized Snell's law.

One difference between a regular surface and a passive meta-surface thus lies in the capability of the passive meta-surface of shaping, or reflecting, incoming electromagnetic waves, such as radio waves, according to the generalized Snell's laws of reflection and refraction. For example, the angles of incidence and reflection of the radio waves are not necessarily the same in a passive meta-surface. Thus, with reference back to the example of FIG. 1, if object 110b is provided with a passive-meta surface, the reflection of the signal via physical object 110b could be controlled by a physical object 110b being provided with a passive meta-surface such that the signal does reach wireless device 400a. This is illustrated in FIG. 2. FIG. 2 shows a communications network 100b having the same components as the communications network 100a but where a reflection node 200 having a passive meta-surface 250 is provided at physical object 110b such that the signal from network node 300a reaches wireless device 400a via the non-line of sight signal paths corresponding to communication channel 120b.

In general terms, the reflection node 200 is configured to control the reflection angle of the passive meta-surface. In order to do so, a separate control channel is established between network node 300a and the reflection node 200.

The control channel is typically wirelessly established using any known cellular communication techniques using carrier frequencies below 6 GHz, or any local wireless area network standard, such as WiFi, or other radio access technology used over unlicensed radio spectrum. However, the control channel could also be established over a wired medium, such as a fiber optical cable.

However, there is a risk that disturbances occur on the control channel between the network node 300a and the reflection node 200 whilst the communication between network node 300a and the wireless device 400a via the passive meta-surface is still operational (for example using another communications technology, frequency band, etc.). Because of the disturbances occur on the control channel it is no longer possible for the network node 300a to instruct the reflection node 200 how to control the reflection angle of the passive meta-surface. In turn, this might cause the communication channel 120b to be dropped.

Hence, there is a need for mechanisms to handle a link failure between network nodes and reflection nodes.

SUMMARY

An object of embodiments herein is to provide mechanisms for handling of link failures between network nodes and reflection nodes such that the above issues can be avoided, or at least mitigated or reduced.

According to a first aspect there is presented a reflection node for handling link failure towards a network node. The reflection node comprises a controller for controlling a passive meta-surface having a controllable reflection angle for reflecting radio waves over a communication channel between a network node and a wireless device. The reflection node comprises a transceiver unit for receiving instructions from the network node over a control channel. The transceiver unit is configured to determine a link failure event on the control channel between the reflection node and the network node. The controller is configured to, during the link failure event, control the reflection angle of the passive meta-surface using reflection settings specified by configuration data for reflecting the radio waves over the communication channel.

According to a second aspect there is presented a method for handling link failure towards a network node. The method is performed by a reflection node. The reflection node comprises a passive meta-surface having a controllable reflection angle for reflecting radio waves over a communication channel between the network node and a wireless device. The reflection node receives instructions from the network node over a control channel. The method comprises determining a link failure event on the control channel between the reflection node and the network node. The method comprises, in response thereto, controlling, during the link failure event and using reflection settings specified by configuration data, the reflection angle of the passive meta-surface for reflecting the radio waves over the communication channel.

According to a third aspect there is presented a computer program for handling link failure towards a network node, the computer program comprises computer program code which, when run on processing circuitry of a reflection node, causes the reflection node to perform a method according to the second aspect.

According to a fourth aspect there is presented a network node for handling link failure towards a reflection node. The network node comprises a communications interface for sending instructions to the reflection node over a control channel, and for using radio waves to communicate with at least one wireless device over a communication channel The radio waves are, between the network node and the wireless device, reflected at a reflection angle at a passive meta-surface of the reflection node. The network node comprises processing circuitry configured to determine a link failure event on the control channel between the network node and the reflection node. The processing circuitry is configured to, during the link failure event, control the communications interface for communication with the wireless device in accordance with configuration data. The configuration data specifies reflection settings according to which the reflection angle at the passive meta-surface of the reflection node is to be controlled during the link failure event.

According to a fifth aspect there is presented a method for handling link failure towards a reflection node. The method is performed by a network node. The network node sends instructions to the reflection node over a control channel. The network node uses radio waves for communicating with at least one wireless device over a communication channel. The radio waves are, between the network node and the wireless device, reflected at a reflection angle at a passive meta-surface of the reflection node. The method comprises determining a link failure event on the control channel between the network node and the reflection node. The method comprises, in response thereto, communicating with the wireless device in accordance with configuration data during the link failure event. The configuration data specifies reflection settings according to which the reflection angle at the passive meta-surface of the reflection node is to be controlled during the link failure event.

According to a sixth aspect there is presented a computer program for handling link failure towards a reflection node, the computer program comprising computer program code which, when run on processing circuitry of a network node, causes the network node to perform a method according to the fifth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously this reflection node, this network node, these methods, these computer programs and this computer program product enable handling of link failures between network nodes and reflection nodes where the above issues are avoided.

Advantageously, by enabling a well-defined behavior of how the reflection node controls the reflection angle in case the control channel between the network node and the reflection node drops, both the network node and the reflection node still have knowledge of how the reflection node will behave.

In turn this improves the chance of maintaining the connection between the network node and its served wireless devices in situations where signals between the network node and the wireless devices are reflected by the passive meta-surface controlled by the reflection node.

In turn this leads to increased system capacity and user experience.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 7 is a schematic diagram showing functional units of a reflection node according to an embodiment;

FIG. 8 is a schematic diagram showing functional modules of a reflection node according to an embodiment;

FIG. 9 is a schematic diagram showing functional units of a network node according to an embodiment;

FIG. 10 is a schematic diagram showing functional modules of a network node according to an embodiment; and FIG. 11 shows one example of a computer program product comprising computer readable means according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is a need for mechanisms to handle a link failure between network nodes and reflection nodes. An object of embodiments herein is therefore to provide mechanisms for handling of link failures between network nodes and reflection nodes such that the above issues can be avoided, or at least mitigated or reduced The embodiments disclosed herein thus relate to mechanisms for handling link failure towards a network node 300a, 300b and handling link failure towards a reflection node 200. In order to obtain such mechanisms there is provided a reflection node 200, a method performed by the reflection node 200, a computer program product comprising code, for example in the form of a computer program, that when run on processing circuitry of the reflection node 200, causes the reflection node 200 to perform the method. In order to obtain such mechanisms there is further provided a network node 300a, 300b, a method performed by the network node 300a, 300b, and a computer program product comprising code, for example in the form of a computer program, that when run on processing circuitry of the network node 300a, 300b, causes the network node 300a, 300b to perform the method.

Figure 1:
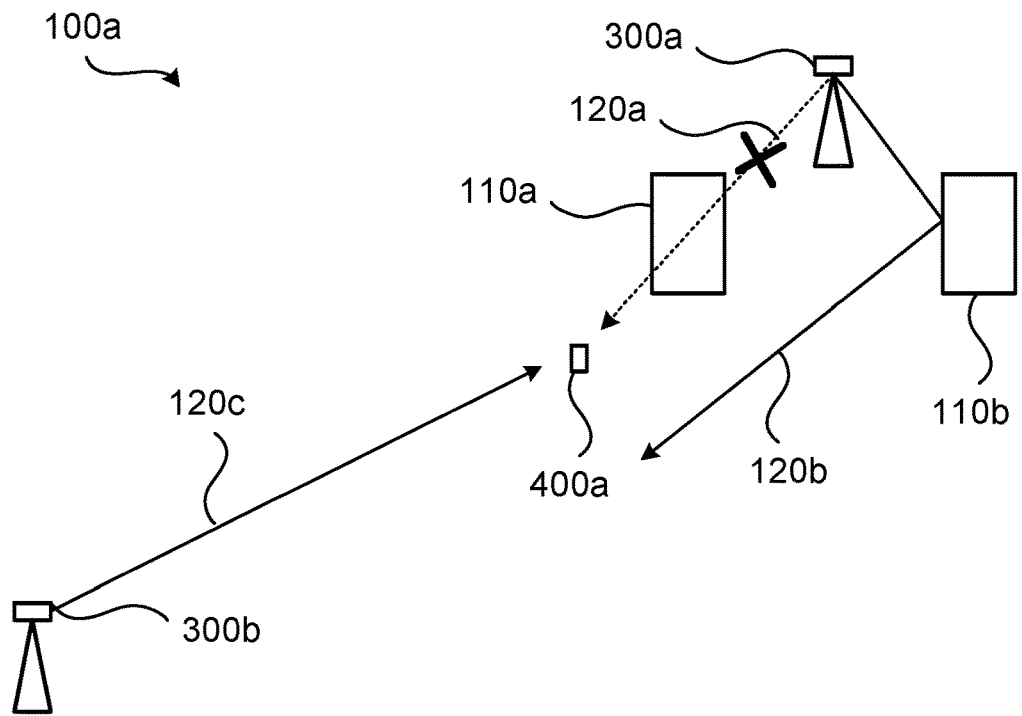
FIGS. 1, 2 and 3 are schematic diagrams illustrating a communication network according to embodiments.
Figure 2:
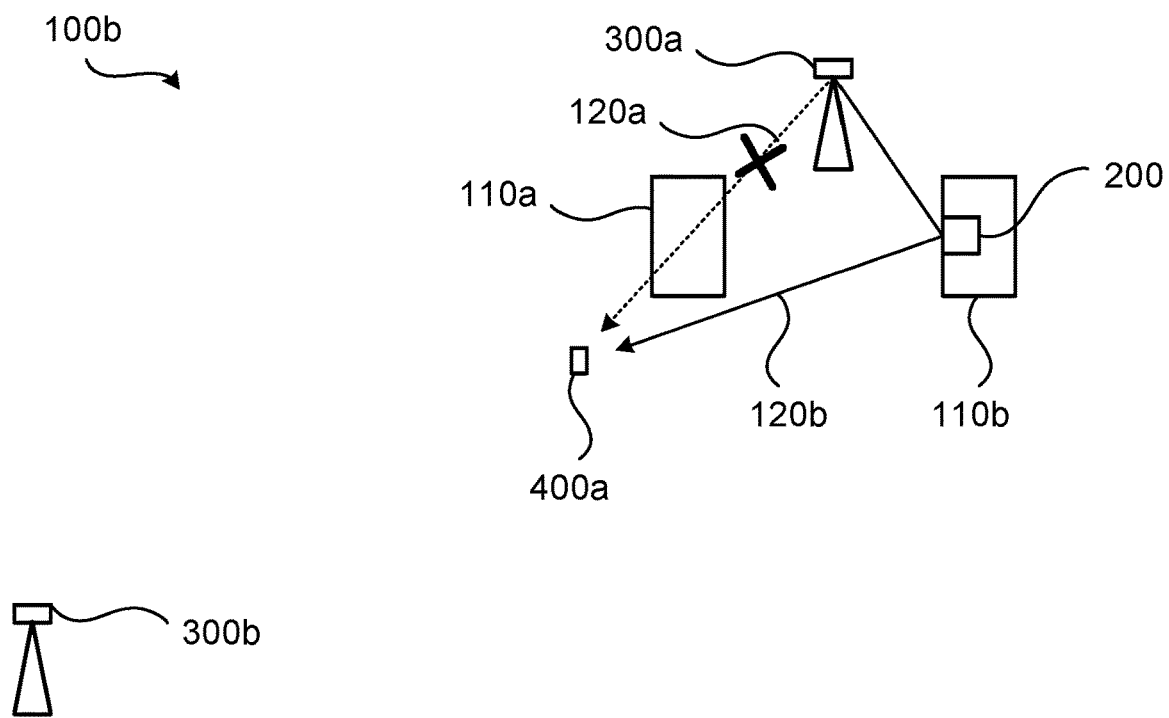
Figure 3:
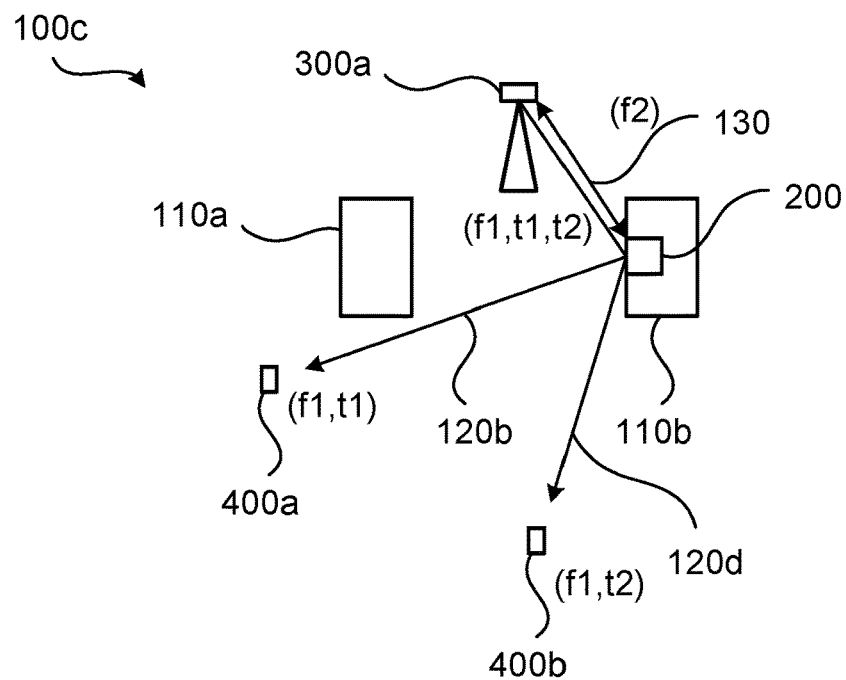
Figure 4:
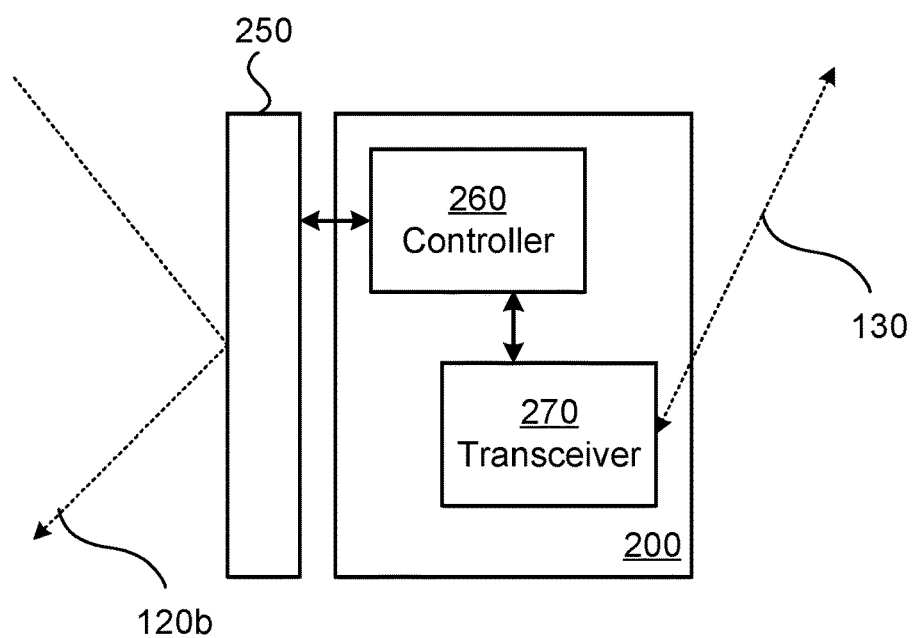
FIG. 4 is a block diagram of a reflection node according to an embodiment.

Embodiments of a reflection node 200 for handling link failure towards a network node 300a, 300b will now be disclosed with parallel reference to FIG. 3 and FIG. 4. FIG. 3 shows a communications network 100c having the same components as the communications network 100b but without network node 300b and with network node 300a serving two wireless devices 400a, 400b and where the reflection node 200 is configured according to embodiments disclosed herein. Each of the wireless devices 400a, 400b could be any of a portable wireless device, mobile station, mobile phone, handset, wireless local loop phone, user equipment (UE), smartphone, wearable communication device, laptop computer, tablet computer, wireless modem, wireless sensor device, network equipped vehicle, Internet of Things (IoT) device. In FIG. 3 network node 300a communicates with wireless devices 400a, 400b at respective different times (T1, T2), via the reflection node 200, over communication channels 120a, 120d in a first frequency interval (f1), whilst network node 300a communicates with the reflection node 200 over a control channel 130 in a second frequency interval (f2). Although the control channel 130 is illustrated as established over a wireless link, the control channel 130 might be established between a wired link between network node 300a and the reflection node 200. The network node 300a is thereby enabled to control the reflection angle of the passive meta-surface at the reflection node 200 such the communication between network node 300a can be maintained with wireless device 400a over communication channel 120a in the first frequency interval f1 during time T1 and with wireless device 400b over communication channel 120d in the first frequency interval f1 during time T2. The first frequency interval f1 might be a mmW frequency interval, whilst the second frequency interval f2 might be a sub 6 GHz frequency interval or at least a frequency interval that is not overlapping with the first frequency interval. FIG. 4 is a block diagram of the reflection node 200 according to an embodiment.

The reflection node 200 comprises a controller 260 for controlling a passive meta-surface 250 having a controllable reflection angle for reflecting radio waves over a communication channel 120a:120d between a network node 300a and a wireless device 400a, 400b.

The reflection node 200 comprises a transceiver unit 270 for receiving instructions from the network node 300a over a control channel 130.

The transceiver unit 270 is configured to determine a link failure event on the control channel 130 between the reflection node 200 and the network node 300a.

The controller 260 is configured to, during the link failure event, control the reflection angle of the passive meta-surface 250 using reflection settings specified by configuration data for reflecting the radio waves over the communication channel 120a:120d.

Advantageously, by enabling a well-defined behavior of how the reflection node 200 controls the reflection angle in case the control channel 130 between the network node 300a and the reflection node 200 drops, both the network node 300a and the reflection node 200 still have knowledge of how the reflection node 200 will behave. In turn this improves the chance of maintaining the connection between the network node 300a and its served wireless devices 400a, 400b in situations where signals between the network node 300a and the wireless devices 400a, 400b are reflected by the passive meta-surface 250 controlled by the reflection node 200. In turn this leads to increased system capacity and user experience.

Embodiments relating to further details of the reflection node 200 will now be disclosed.

There might be different examples of configuration data. Three embodiments relating thereto will now be disclosed in turn.

According to a first embodiment, according to the configuration data, the reflection angle as used immediately before the link failure event was determined is to be maintained. In this respect, the reflection angle might change at least one whilst the link failure is ongoing. For example, the reflection angle might change at a point in time defined by a timer. Hence, the reflection angle might be maintained until a timer expires and then another reflection angle, or angles, might be used. In particular, according to the configuration data, the reflection angle, as used immediately before the link failure event was determined, might be maintained only until a timer, as started when the link failure event was determined, expires. There could be different ways to determine the value of the timer, i.e., the time duration from between when the timer is started until the timer expires. In some examples the timer is aligned with a re-establishment procedure for the link. That is, in some aspects, upon having determined the link failure event, a re-establishment procedure is initiated between the reflection node 200 and the network node 300a. The re-establishment procedure is ongoing at most during a time period, and the timer might then have an expiration time that equals this time period. There could be different ways to determine the reflection angle if the timer expires before the link failure has been resolved. In some examples, the reflection angle takes a value defined by default settings. In particular, in some aspects, when the link failure event is still ongoing upon expiration of the timer, the reflection angle is, according to the configuration data, defined by default reflection settings.

According to a second embodiment, according to the configuration data, the reflection angle is defined by default reflection settings. Hence, default reflection settings might be applied directly when the link failure event has been detected, without the reflection node 200 first maintaining the reflection angle as used immediately before the link failure event was determined.

According to a third embodiment, according to the configuration data, the reflection angle is to be altered according to a set of reflection settings. The set of reflection settings might comprise both the reflection angle as used immediately before the link failure event was determined and one or more default reflection settings. Further in this respect, according to the configuration data, the reflection angle might be periodically altered between reflection settings in the set of reflection settings. For example, the reflection angle might be periodically altered according to time information, such as provided by timestamps. In particular, the configuration data might comprise timestamp, where the timestamps define how the reflection angle is to be timewise altered between reflection settings in the set of reflection settings. Further, in some examples the timestamps define when broadcast symbols will be transmitted and when unicast symbols will be transmitted. That is, in some aspects, broadcast symbols and unicast symbols are communicated on the communication channel 120a:120d between the network node 300a and the wireless device 400a, 400b, and the timestamps are defined by when in the time broadcast symbols will be transmitted and when in time the unicast symbols will be transmitted. In further examples, the timestamps are replaced by triggers as provided by one or more timers such that when a timer expires this triggers the reflection angle to be changed. That is, when a first timer expires, this triggers the reflection angle to be changed a first time (to one value). Then, when a second timer expires, this triggers the reflection angle to be changed a second time (to another value), etc. Thus, timers can be used to sequentially change the reflection angle from one value to the next. In further examples default settings are used for broadcast symbols whereas the last used settings are maintained for unicast symbols. That is, in some aspects, according to the configuration data, the reflection angle is defined by a first setting when the broadcast symbols are transmitted and the reflection angle is defined by a second setting when the unicast symbols are transmitted. Further, in some examples, the first setting is a default reflection setting, whilst according to the second setting the reflection angle as used immediately before the link failure event was determined is to be used when the broadcast symbols are transmitted.

Aspects of the passive meta-surface 250 and how its reflection angle might be controlled will now be disclosed. In some embodiments the passive meta-surface 250 comprises at least two passive meta-surface parts. Then, according to the configuration data, the reflection angle might be different for each of the at least two passive meta-surface parts. Hence, one state might be applied to one subsurface of the passive meta-surface 250 whereas another state is simultaneously applied to another subsurface of the passive meta-surface 250, where each state corresponds to a unique reflection angle, or set of reflection angles that are sequentially applied. That is, the passive meta-surface 250 might have two or more reflection angles at one and the same time. For example, one subsurface of the passive meta-surface 250 that is be used to reflect broadcast signals may be configured according to one state whereas another subsurface of the passive meta-surface 250 that simultaneously is used to reflect unicast signals may be configured according to another state. Alternatively, or additionally, two or more subsurfaces may share a state for one symbol but may be configured with individual states for another symbol. Hence there might thus be one first setting and one second setting for each of the at least two passive meta-surface parts.

Further, according to the above, the reflection node 200 and the passive meta-surface 250 are at least arranged with respect to each other such that the controller 260 of the reflection node 200 is configured to, during the link failure event, control the reflection angle of the passive meta-surface 250. In some aspects, the passive meta-surface 250 is part of the reflection node 200. That is, in some embodiments the reflection node 200 further comprises the passive meta-surface 250.

There could be different ways for the reflection node 200 to obtain the configuration data. In some embodiments the configuration data is obtained from the network node 300a over the control channel 130 before the link failure event has been determined. In other embodiments the configuration data is pre-configured in the reflection node 200. In either case, but especially for the latter case, the configuration data might be standardized configuration data, at least based on a standard, or defined by a predefined rule. In some examples, the configuration data is obtained as a combination of configuration data from the network node 300a (e.g. as an indicator is signaled from the network node 300a) and predefined rules (e.g., where the indicator points to one of the predefined rules, the predefined rules may be set in a standard).

There could be different types of link failures. In general terms, the type of link failure depends on the operative connection between the reflection node 200 and the network node 300*a*. In some embodiments, the reflection node 200 has a wireless connection towards the network node 300*a* for the control channel 130 and the link failure is a radio link failure. For example, if the control channel 130 is over a wireless connection, the radio link quality of the control channel 130 might be monitored, and if the radio link quality goes below a threshold quality level for a certain time (or the amount of decoding errors of packets sent on the control channel 130 is higher than an error threshold for a certain time), a radio link failure event, defining the link failure event, is detected. In other embodiments the reflection node 200 has a wired connection towards the network node 300*a* for the control channel 130 and the link failure is a failure on the wired link.

As disclosed above, the control channel 130 might be on a different frequency interval than the communication channel(s) 120*a*:120*d*. That is, in some embodiments the communication channel(s) 120*a*:120*d* is/are using a first carrier frequency (in a first frequency interval f1) and the control channel 130 is using a second carrier frequency (in a second frequency interval f2) different from the first carrier frequency.

As disclosed above, under normal operation (i.e., when there is not any link failure on the control channel 130) the reflection node 200 is instructed by the network node 300*a* how to control the reflection angle of the passive meta-surface 250. That is, in some embodiments the instructions received from the network node 300*a* pertain to reflection setting according to which the reflection angle of the passive meta-surface 250 is to be controlled in absence of the link failure event on the control channel 130.

Embodiments of a network node 300*a* for handling link failure towards a reflection node 200 will now be disclosed with reference to FIG. 9, which will also be further described below.

The network node 300*a* comprises a communications interface 320 for sending instructions to the reflection node 200 over a control channel 130, and for using radio waves to communicate with at least one wireless device 400*a*, 400*b* over a communication channel 120*a*:120*d*. The radio waves are, between the network node 300*a* and the wireless device 400*a*, 400*b*, reflected at a reflection angle at a passive meta-surface 250 of the reflection node 200.

The network node 300*a* comprises processing circuitry 310 configured to determine a link failure event on the control channel 130 between the network node 300*a* and the reflection node 200

The processing circuitry 310 is configured to, during the link failure event, control the communications interface 320 for communication with the wireless device 400*a*, 400*b* in accordance with configuration data. The configuration data specifies reflection settings according to which the reflection angle at the passive meta-surface 250 of the reflection node 200 is to be controlled during the link failure event.

The embodiments as disclosed above in conjunction with the description of the reflection node 200 are applicable also for the network node 300*a*. However, for completeness of this disclosure, the embodiments as applicable for the network node 300*a* and relating to further details of the network node 300*a* will now be disclosed.

As disclosed above, might be different examples of configuration data. Three embodiments relating thereto will now be disclosed in turn According to a first embodiment, according to the configuration data, the reflection angle as used immediately before the link failure event was determined is to be maintained. In this respect, the reflection angle might change at least one whilst the link failure is ongoing. For example, the reflection angle might change at a point in time defined by a timer. Hence, the reflection angle might be maintained until a timer expires and then another reflection angle, or angles, might be used. In particular, according to the configuration data, the reflection angle, as used immediately before the link failure event was determined, is to be maintained only until a timer, as started when the link failure event was determined, expires.

There could be different ways to determine the value of the timer, i.e., the time duration from between when the timer is started until the timer expires. In some examples the timer is aligned with a re-establishment procedure for the link. That is, in some aspects, upon having determined the link failure event, a re-establishment procedure is initiated between the reflection node 200 and the network node 300*a*. The re-establishment procedure is ongoing at most during a time period, and the timer might then have an expiration time that equals this time period. There could be different ways to determine the reflection angle if the timer expires before the link failure has been resolved. In some examples, the reflection angle takes a value defined by default settings. In particular, in some aspects, when the link failure event is still ongoing upon expiration of the timer, the reflection angle is, according to the configuration data, defined by default reflection settings.

According to a second embodiment, according to the configuration data, the reflection angle is defined by one or more default reflection settings.

According to a third embodiment, according to the configuration data, the reflection angle is to be altered according to a set of reflection settings. The set of reflection settings might comprise both the reflection angle as used immediately before the link failure event was determined and default reflection settings. Further in this respect, according to the configuration data, the reflection angle might be periodically altered between reflection settings in the set of reflection settings. For example, the reflection angle might be periodically altered according to time information, such as provided by timestamps. In particular, the configuration data might comprise timestamp, where the timestamps define how the reflection angle is to be time-wise altered between reflection settings in the set of reflection settings. Further, in some examples the timestamps define when broadcast symbols will be transmitted and when unicast symbols will be transmitted. That is, in some aspects, broadcast symbols and unicast symbols are communicated on the communication channel 120*a*:120*d* between the network node 300*a* and the wireless device 400*a*, 400*b*, and the timestamps are defined by when in the time broadcast symbols will be transmitted and when in time the unicast symbols will be transmitted. In further examples, the timestamps are replaced by triggers as provided by one or more timers such that when a timer expires this triggers the reflection angle to be changed. That is, when a first timer expires, this triggers the reflection angle to be changed a first time. Then, when a second timer expires, this triggers the reflection angle to be changed a second time, etc. Thus, timers can be used to sequentially change the reflection angle from one value to the next. In further examples default settings are used for broadcast symbols whereas the last used settings are maintained for unicast symbols. That is, in some aspects, according to the configuration data, the reflection angle is defined by a first setting when the broadcast symbols are transmitted and the reflection angle is defined by a second setting when the unicast symbols are transmitted. Further, in some examples, the first setting is a default reflection setting, whilst according to the second setting the reflection angle as used immediately before the link failure event was determined is to be used when the broadcast symbols are transmitted.

In some embodiments, according to the configuration data, the reflection angle is different for each part of the passive meta-surface 250.

In some aspects the network node 300a provides the configuration data to the reflection node 200. In particular, in some embodiments, the configuration data is provided to the reflection node 200 over the control channel 130 before the link failure event has been determined.

As disclosed above, there could be different types of link failures and, in general terms, the type of link failure depends on the operative connection between the network node 300a and the reflection node 200. In some embodiments, the network node 300a has a wireless connection towards the reflection node 200 for the control channel 130 and the link failure is a radio link failure. In other embodiments, the network node 300a has a wired connection towards the reflection node 200 for the control channel 130 and the link failure is a failure on the wired link.

As disclosed above, the control channel 130 might be on a different frequency interval than the communication channel(s) 120a:120d. That is, in some embodiments the communication channel(s) 120a:120d is/are using a first carrier frequency (in a first frequency interval f1) and the control channel 130 is using a second carrier frequency (in a second frequency interval f2) different from the first carrier frequency.

As disclosed above, under normal operation (i.e., when there is not any link failure on the control channel 130) the network node 300a instructs the reflection node 200 how to control the reflection angle of the passive meta-surface 250. That is, in some embodiments the instructions sent to the reflection node 200 pertain to reflection setting according to which the reflection angle of the passive meta-surface 250 is to be controlled in absence of the link failure event on the control channel 130.

Figure 5:
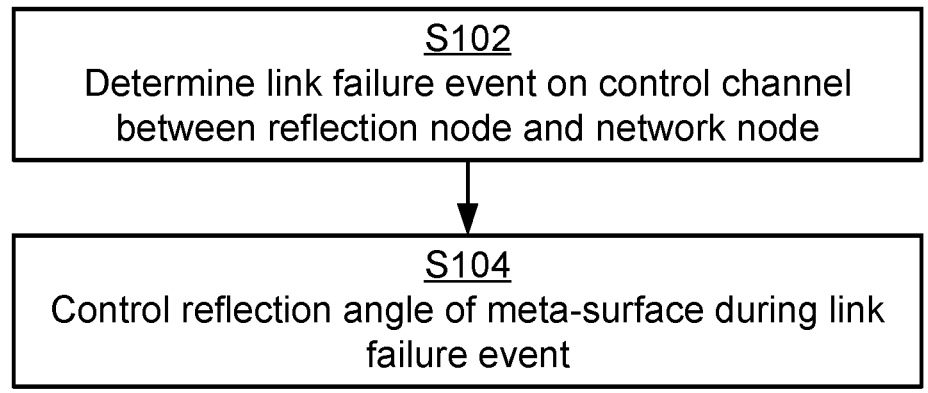
FIGS. 5 and 6 are flowcharts of methods according to embodiments.

Reference is now made to FIG. 5 illustrating a method for handling link failure towards a network node 300a as performed by the reflection node 200 according to any of the above disclosed embodiments. The reflection node 200 comprises a passive meta-surface 250 having a controllable reflection angle for reflecting radio waves over a communication channel 120a:120d between the network node 300a and a wireless device 400a, 400b. The reflection node 200 receives instructions from the network node 300a over a control channel 130.

S102: The reflection node 200 determines a link failure event on the control channel 130 between the reflection node 200 and the network node 300a.

The reflection node 200 in response thereto (i.e., in response to having determined the link failure event) performs step S104.

S104: The reflection node 200 controls, during the link failure event and using reflection settings specified by configuration data, the reflection angle of the passive meta-surface 250 for reflecting the radio waves over the communication channel 120a:120d.

Figure 6:
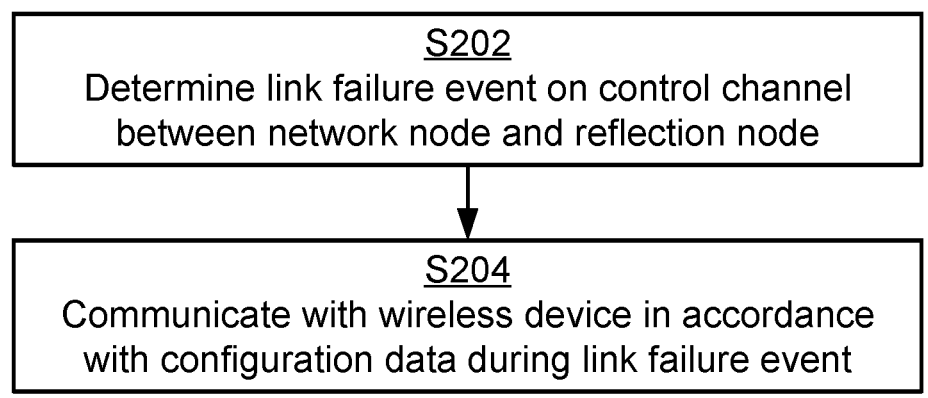

Reference is now made to FIG. 6 illustrating a method for handling link failure towards a reflection node 200 as performed by the network node 300a according to any of the above disclosed embodiments. The network node 300a sends instructions to the reflection node 200 over a control channel 130. The network node 300a uses radio waves for communicating with at least one wireless device 400a, 400b over a communication channel 120a:120d. The radio waves are, between the network node 300a and the wireless device 400a, 400b, reflected at a reflection angle at a passive meta-surface 250 of the reflection node 200.

S202: The network node 300a determines a link failure event on the control channel 130 between the network node 300a and the reflection node 200.

The network node 300a in response thereto (i.e., in response to having determined the link failure event) performs step S204.

S204: The network node 300a communicates with the wireless device 400a, 400b in accordance with configuration data during the link failure event. The configuration data specifies reflection settings according to which the reflection angle at the passive meta-surface 250 of the reflection node 200 is to be controlled during the link failure event.

One particular embodiment for handling link failure between a reflection node 200 and a network node 300a based at least on some of above disclosed embodiments will now be disclosed.

The transceiver unit 270 in the reflection node 200 obtains configuration data the reflection node 200 should use in case the transceiver unit 270 determines a link failure event on the control channel 130. The configuration data specifies the reflection settings to be used by the controller 260 in the reflection node 200 for controlling the reflection angle of the passive meta-surface 250 for reflecting radio waves of a communication channel between the network node 300a and wireless devices 400a, 400b via the reflection node 200.

Either the transceiver unit 270 or the controller 260 via the transceiver unit 270 monitors the quality of the control channel 130. The reflection node 200 is thereby enabled to determine a link failure event of the control channel 130 according to well-known configured procedures.

The controller 260 controls the reflection angle of the passive meta-surface 250 during the link failure event according to the configuration data. Examples of configuration data and which value, or values, the reflection angle might take depending on the configuration data have been disclosed above.

The reflection node 200 starts a connection re-establishment procedure to re-connect the control channel 130 to the network node 300a. The re-establishment procedure may follow any well-known re-establishment procedures. The re-establishment procedure might be ongoing for a time period (e.g., until a timer expires), and if the connection is not setup until the timer expires, the connection is determined to be released.

FIG. 7 schematically illustrates, in terms of a number of functional units, the components of a reflection node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the reflection node 200 to perform a set of operations, or steps, as disclosed above. For example, the storage medium 230 may store the set of operations, and the processing circuitry 210 may be configured to retrieve the set of operations from the storage medium 230 to cause the reflection node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The reflection node 200 may further comprise a communications interface 220 for communications with at least one network node 300a, 300b. As such the communications interface 220 may comprise one or more transmitters and receivers, comprising analogue and digital components.

The processing circuitry 210 controls the general operation of the reflection node 200 e.g. by sending data and control signals to the communications interface 220 and the storage medium 230, by receiving data and reports from the communications interface 220, and by retrieving data and instructions from the storage medium 230. Other components, as well as the related functionality, of the reflection node 200 are omitted in order not to obscure the concepts presented herein.

FIG. 8 schematically illustrates, in terms of a number of functional modules, the components of a reflection node 200 according to an embodiment. The reflection node 200 of FIG. 8 comprises a number of functional modules; a determine module 210a configured to perform step S102 and a control module 210b configured to perform step S104. The reflection node 200 of FIG. 8 may further comprise a number of optional functional modules, such represented by functional module 210c. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the reflection node 200 as disclosed herein.

FIG. 9 schematically illustrates, in terms of a number of functional units, the components of a network node 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300a, 300b to perform a set of operations, or steps, as disclosed above. For example, the storage medium 330 may store the set of operations, and the processing circuitry 310 may be configured to retrieve the set of operations from the storage medium 330 to cause the network node 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300a, 300b may further comprise a communications interface 320 for communications with the reflection node 200 as well as with wireless devices 400a, 400b. As such the communications interface 320 may comprise one or more transmitters and receivers, comprising analogue and digital components.

The processing circuitry 310 controls the general operation of the network node 300a, 300b e.g. by sending data and control signals to the communications interface 320 and the storage medium 330, by receiving data and reports from the communications interface 320, and by retrieving data and instructions from the storage medium 330. Other components, as well as the related functionality, of the network node 300a, 300b are omitted in order not to obscure the concepts presented herein.

FIG. 10 schematically illustrates, in terms of a number of functional modules, the components of a network node 300a, 300b according to an embodiment. The network node 300a, 300b of FIG. 10 comprises a number of functional modules; a determine module 310a configured to perform step S202 and a control module 310b configured to perform step S204. The network node 300a, 300b of FIG. 10 may further comprise a number of optional functional modules, such represented by functional module 310c. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the network node 300a, 300b as disclosed herein.

The network node 300a, 300b could be part of, integrated with, or collocated with, any of a (radio) access network node, radio base station, base transceiver station, node B (NB), evolved node B (eNB), gNB, access point, access node, or integrated access and backhaul (IAB) node.

The network node 300a, 300b may be provided as a standalone device or as a part of at least one further device. For example, the network node 300a, 300b may be provided in a node of the radio access network or in a node of the core network. Alternatively, functionality of the network node 300a, 300b may be distributed between at least two devices, or nodes. These at least two nodes, or devices, may either be part of the same network part (such as the radio access network or the core network) or may be spread between at least two such network parts.

Thus, a first portion of the instructions performed by the network node 300a, 300b may be executed in a first device, and a second portion of the instructions performed by the network node 300a, 300b may be executed in a second device; the herein disclosed embodiments are not limited to any particular number of devices on which the instructions performed by the network node 300a, 300b may be executed. Hence, the methods according to the herein disclosed embodiments are suitable to be performed by a network node 300a, 300b residing in a cloud computational environment. Therefore, although a single processing circuitry 310 is illustrated in FIG. 9 the processing circuitry 310 may be distributed among a plurality of devices, or nodes. The same applies to the functional modules 310a-310c of FIG. 8 10 and the computer program 1120b of FIG. 11.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the reflection node 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the network node 300a, 300b as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A reflection node for handling link failure towards a network node, the reflection node comprising:
a controller configured to control a passive meta-surface having a controllable reflection angle for reflecting radio waves over a communication channel between a network node and a wireless device; and
a transceiver unit configured to receive instructions from the network node over a control channel;
the transceiver unit being configured to determine a link failure event on the control channel between the reflection node and the network node; and
the controller being configured to, during the link failure event, control the reflection angle of the passive meta-surface using reflection settings specified by configuration data for reflecting the radio waves over the communication channel.

2. The reflection node according to claim 1, wherein, according to the configuration data, the reflection angle as used immediately before the link failure event was determined is to be maintained.

3. The reflection node according to claim 2, wherein, according to the configuration data, the reflection angle, as used immediately before the link failure event was determined, is to be maintained only until a timer, as started when the link failure event was determined, expires.

4. The reflection node according to claim 3, wherein, upon having determined the link failure event, a re-establishment procedure is initiated between the reflection node and the network node, wherein the re-establishment procedure is ongoing at most during a time period, and wherein the timer has an expiration time that equals the time period.

5. The reflection node according to claim 4, wherein, when the link failure event is still ongoing upon expiration of the timer, the reflection angle is, according to the configuration data, defined by default reflection settings.

6. The reflection node according to claim 1, wherein, according to the configuration data, the reflection angle is to be altered according to a set of reflection settings.

7. The reflection node according to claim 6, wherein, according to the configuration data, the reflection angle is to be periodically altered between reflection settings in the set of reflection settings.

8. The reflection node according to claim 6, wherein the configuration data comprises timestamps, and wherein the timestamps define how the reflection angle is to be time-wise altered between reflection settings in the set of reflection settings.

9. The reflection node according to claim 8, wherein broadcast symbols and unicast symbols are communicated on the communication channel between the network node and the wireless device, and wherein the timestamps are defined by when in the time broadcast symbols will be transmitted and when in time the unicast symbols will be transmitted.

10. The reflection node according to claim 1, wherein the passive meta-surface comprises at least two passive meta-surface parts, and wherein, according to the configuration data, the reflection angle is to be different for each of the at least two passive meta-surface parts.

11. A method for handling link failure towards a network node, the method being performed by a reflection node, the reflection node comprising a passive meta-surface having a controllable reflection angle for reflecting radio waves over a communication channel between the network node and a wireless device, the reflection node receiving instructions from the network node over a control channel, the method comprising:
determining a link failure event on the control channel between the reflection node and the network node; and
in response thereto:
controlling, during the link failure event and using reflection settings specified by configuration data, the reflection angle of the passive meta-surface for reflecting the radio waves over the communication channel.

12. A network node for handling link failure towards a reflection node, the network node comprising:
a communications interface configured to send instructions to the reflection node over a control channel, and to use radio waves to communicate with at least one wireless device over a communication channel, the radio waves being, between the network node and the wireless device, reflected at a reflection angle at a passive meta-surface of the reflection node; and
processing circuitry configured to determine a link failure event on the control channel between the network node and the reflection node, the processing circuitry being configured to, during the link failure event, control the communications interface for communication with the wireless device in accordance with configuration data, wherein the configuration data specifying reflection settings according to which the reflection angle at the passive meta-surface of the reflection node is to be controlled during the link failure event.

13. The network node according to claim 12, wherein, according to the configuration data, the reflection angle as used immediately before the link failure event was determined is to be maintained.

14. The network node according to claim 13, wherein, according to the configuration data, the reflection angle, as used immediately before the link failure event was determined, is to be maintained only until a timer, as started when the link failure event was determined, expires.

15. The network node according to claim 14, wherein, upon having determined the link failure event, a re-establishment procedure is initiated between the reflection node and the network node, wherein the re-establishment procedure is ongoing at most during a time period, and wherein the timer has an expiration time that equals the time period.

16. The network node according to claim 12, wherein, according to the configuration data, the reflection angle is to be altered according to a set of reflection settings.

17. The network node according to claim 16, wherein, according to the configuration data, the reflection angle is to be periodically altered between reflection settings in the set of reflection settings.

18. The network node according to claim 16, wherein the configuration data comprises timestamps, and wherein the timestamps define how the reflection angle is to be time-wise altered between reflection settings in the set of reflection settings.

19. The network node according to claim 18, wherein broadcast symbols and unicast symbols are communicated on the communication channel between the network node and the wireless device, and wherein the timestamps are defined by when in the time broadcast symbols will be transmitted and when in time the unicast symbols will be transmitted.

20. A method for handling link failure towards a reflection node, the method being performed by a network node, the network node sending instructions to the reflection node over a control channel, the network node using radio waves for communicating with at least one wireless device over a communication channel, the radio waves being, between the network node and the wireless device, reflected at a reflection angle at a passive meta-surface of the reflection node, the method comprising:

determining a link failure event on the control channel between the network node and the reflection node; and in response thereto:

communicating with the wireless device in accordance with configuration data during the link failure event, wherein the configuration data specifies reflection settings according to which the reflection angle at the passive meta-surface of the reflection node is to be controlled during the link failure event.

* * * * *